United States Patent
Sirineni et al.

(10) Patent No.: US 12,278,830 B2
(45) Date of Patent: Apr. 15, 2025

(54) SYSTEMS AND METHODS USING NETWORK ARTIFICIAL INTELLIGENCE TO MANAGE CONTROL PLANE SECURITY IN REAL-TIME

(71) Applicant: Axiado Corporation, San Jose, CA (US)

(72) Inventors: Gopi Sirineni, San Jose, CA (US); Raghu Kondapalli, San Jose, CA (US); Alexander Bachmutsky, Sunnyvale, CA (US)

(73) Assignee: Axiado Corporation, San Jose, CA (US)

( * ) Notice: Subject to any disclaimer, the term of this patent is extended or adjusted under 35 U.S.C. 154(b) by 186 days.

(21) Appl. No.: 17/897,676

(22) Filed: Aug. 29, 2022

(65) Prior Publication Data

US 2023/0060207 A1    Mar. 2, 2023

Related U.S. Application Data

(60) Provisional application No. 63/238,933, filed on Aug. 31, 2021.

(51) Int. Cl.
*H04L 9/40* (2022.01)
*G06N 3/08* (2023.01)
(Continued)

(52) U.S. Cl.
CPC ........... *H04L 63/1425* (2013.01); *G06N 3/08* (2013.01); *H04L 41/16* (2013.01);
(Continued)

(58) Field of Classification Search
CPC . H04L 63/1425; H04L 41/16; H04L 63/0263; H04L 63/1441; H04L 69/22;
(Continued)

(56) References Cited

U.S. PATENT DOCUMENTS

| 5,937,036 A | 8/1999 | Dean et al. |
| 6,868,492 B1 | 3/2005 | McCarty et al. |

(Continued)

FOREIGN PATENT DOCUMENTS

| CN | 109995507 A | 7/2019 |
| DE | 102010045580 A1 | 3/2012 |

(Continued)

OTHER PUBLICATIONS

U.S. Appl. No. 17/006,717 Final Office Action dated Mar. 23, 2023.
(Continued)

*Primary Examiner* — Shaqueal D Wade-Wright
(74) *Attorney, Agent, or Firm* — Wilson Sonsini Goodrich & Rosati

(57) ABSTRACT

Described are methods, systems, and media for detecting malicious activity in a network by performing operations comprising: feeding network packets from the network into a header crypto engine; sending the network packets from the header crypto engine to a work scheduler; divaricating the network packets using the work scheduler based on flow data and header data of the network packets to at least one of a firewall and a neural network processor; generating output data comprising: a first output data from the firewall according to rules of the firewall; a second output data from the neural network processor based on behavioral analysis performed by the neural network processor, wherein the second output data is used to update the rules in the firewall; and aggregating the output data from the firewall and the neural network processor to detect malicious activity in the network.

31 Claims, 6 Drawing Sheets

(51) Int. Cl.
*H04L 41/16* (2022.01)
*H04L 67/60* (2022.01)
*H04L 69/22* (2022.01)
*G06F 21/55* (2013.01)
*G06F 21/56* (2013.01)

(52) U.S. Cl.
CPC ...... *H04L 63/0263* (2013.01); *H04L 63/1441* (2013.01); *H04L 67/60* (2022.05); *H04L 69/22* (2013.01); *G06F 21/554* (2013.01); *G06F 21/56* (2013.01); *G06F 21/562* (2013.01); *H04L 63/1416* (2013.01)

(58) Field of Classification Search
CPC ................. H04L 43/0876; H04L 41/40; H04L 2463/142; H04L 67/60; H04L 63/1416; H04L 63/14; G06N 3/08; G06F 21/50; G06F 21/55; G06F 21/552; G06F 21/554; G06F 21/56; G06F 21/562; G06F 21/566
See application file for complete search history.

(56) References Cited

U.S. PATENT DOCUMENTS

| | | | |
|---|---|---|---|
| 7,437,568 | B2 | 10/2008 | Das-Purkayastha et al. |
| 7,831,839 | B2 | 11/2010 | Hatakeyama |
| 7,945,792 | B2 | 5/2011 | Cherpantier |
| 8,060,732 | B2 | 11/2011 | Jones et al. |
| 8,533,444 | B2 | 9/2013 | Jun |
| 8,938,792 | B2 | 1/2015 | Koeberl et al. |
| 8,990,548 | B2 | 3/2015 | Varnum et al. |
| 9,177,122 | B1 | 11/2015 | Trier |
| 9,230,112 | B1 | 1/2016 | Peterson et al. |
| 9,602,282 | B2 | 3/2017 | Hussain |
| 9,710,651 | B2 | 7/2017 | Stewart et al. |
| 9,755,831 | B2 | 9/2017 | Laver et al. |
| 9,930,051 | B1 | 3/2018 | Potlapally et al. |
| 10,284,368 | B2 | 5/2019 | Li et al. |
| 10,331,593 | B2 | 6/2019 | Lambert et al. |
| 10,474,596 | B2 | 11/2019 | Jayakumar et al. |
| 10,592,671 | B2 | 3/2020 | Chen et al. |
| 10,742,421 | B1 | 8/2020 | Wentz et al. |
| 10,936,299 | B2 | 3/2021 | Butcher et al. |
| 11,144,652 | B1 | 10/2021 | Cochell et al. |
| 11,227,047 | B1 | 1/2022 | Vashisht et al. |
| 11,392,301 | B2 | 7/2022 | Kloth |
| 11,416,150 | B2 | 8/2022 | Kloth |
| 11,520,494 | B2 | 12/2022 | Kloth |
| 11,640,250 | B2 | 5/2023 | Kloth |
| 11,644,984 | B2 | 5/2023 | Kloth |
| 11,650,741 | B2 | 5/2023 | Kloth |
| 11,768,611 | B2 | 9/2023 | Kloth |
| 12,008,246 | B2 | 6/2024 | Kloth |
| 2002/0099950 | A1 | 7/2002 | Smith |
| 2003/0097558 | A1 | 5/2003 | England et al. |
| 2005/0022010 | A1 | 1/2005 | Swander et al. |
| 2005/0262571 | A1 | 11/2005 | Zimmer et al. |
| 2007/0076853 | A1 | 4/2007 | Kurapati et al. |
| 2007/0177627 | A1* | 8/2007 | Raju ................. H04J 3/1605 370/469 |
| 2007/0260869 | A1 | 11/2007 | Dade et al. |
| 2007/0283140 | A1 | 12/2007 | Jones et al. |
| 2009/0089572 | A1 | 4/2009 | Jun |
| 2009/0222653 | A1 | 9/2009 | Findeisen et al. |
| 2009/0235355 | A1 | 9/2009 | Chen et al. |
| 2009/0241190 | A1 | 9/2009 | Todd et al. |
| 2010/0001786 | A1 | 1/2010 | Ramachandran et al. |
| 2011/0173457 | A1 | 7/2011 | Reh |
| 2011/0314547 | A1 | 12/2011 | Yoo |
| 2012/0036572 | A1 | 2/2012 | Yoo |
| 2012/0137117 | A1 | 5/2012 | Bosch et al. |
| 2012/0198224 | A1 | 8/2012 | Leclercq |
| 2014/0189340 | A1 | 7/2014 | Hadley |
| 2014/0223564 | A1 | 8/2014 | Joo et al. |
| 2015/0006914 | A1 | 1/2015 | Oshida |
| 2015/0012737 | A1 | 1/2015 | Newell |
| 2015/0199520 | A1 | 7/2015 | Woolley et al. |
| 2016/0013110 | A1 | 1/2016 | Brokish et al. |
| 2016/0147996 | A1 | 5/2016 | Martinez |
| 2016/0300064 | A1 | 10/2016 | Stewart et al. |
| 2017/0099310 | A1 | 4/2017 | Di Pietro et al. |
| 2017/0126405 | A1 | 5/2017 | Li et al. |
| 2017/0312530 | A1 | 11/2017 | Schilling et al. |
| 2017/0366186 | A1 | 12/2017 | Reese |
| 2018/0096151 | A1 | 4/2018 | Ghetie et al. |
| 2018/0144131 | A1 | 5/2018 | Wojnowicz et al. |
| 2018/0145991 | A1 | 5/2018 | McCauley et al. |
| 2018/0165455 | A1 | 6/2018 | Liguori et al. |
| 2018/0181752 | A1 | 6/2018 | Guri et al. |
| 2018/0198809 | A1 | 7/2018 | Kushwaha et al. |
| 2018/0203998 | A1 | 7/2018 | Maisel et al. |
| 2019/0007433 | A1 | 1/2019 | McLane et al. |
| 2019/0007434 | A1 | 1/2019 | McLane et al. |
| 2019/0081983 | A1* | 3/2019 | Teal ................. H04L 47/2475 |
| 2019/0132344 | A1* | 5/2019 | Lem ..................... G06N 20/00 |
| 2019/0311126 | A1 | 10/2019 | Areno et al. |
| 2020/0099815 | A1 | 3/2020 | Ono |
| 2020/0110880 | A1 | 4/2020 | Ghetie et al. |
| 2020/0117804 | A1 | 4/2020 | Laffey et al. |
| 2020/0272480 | A1 | 8/2020 | Admon et al. |
| 2020/0320209 | A1 | 10/2020 | Cohen et al. |
| 2020/0356701 | A1 | 11/2020 | Pruss et al. |
| 2021/0192050 | A1 | 6/2021 | Hird et al. |
| 2021/0312053 | A1 | 10/2021 | Kloth |
| 2021/0377303 | A1* | 12/2021 | Bui ......................... G06F 40/14 |
| 2021/0377304 | A1* | 12/2021 | Ma ........................ G06F 40/284 |
| 2022/0067146 | A1 | 3/2022 | Cai et al. |
| 2022/0255897 | A1* | 8/2022 | Miele .................. H04L 63/1425 |
| 2023/0269237 | A1 | 8/2023 | Sirineni et al. |

FOREIGN PATENT DOCUMENTS

| | | |
|---|---|---|
| EP | 3214567 A1 | 9/2017 |
| EP | 3214797 A1 | 9/2017 |
| WO | WO-2014088172 A1 | 6/2014 |
| WO | WO-2014088239 A1 | 6/2014 |

OTHER PUBLICATIONS

U.S. Appl. No. 17/023,308 Final Office Action dated Sep. 21, 2023.
U.S. Appl. No. 17/023,308 Non-Final Office Action dated Aug. 5, 2022.
U.S. Appl. No. 17/023,308 Non-Final Office Action dated Feb. 13, 2023.
U.S. Appl. No. 17/025,083 Non-Final Office Action dated Mar. 30, 2022.
U.S. Appl. No. 17/025,731 Non-Final Office Action dated Nov. 10, 2022.
U.S. Appl. No. 17/006,717 Notice of Allowance dated Jul. 24, 2023.
U.S. Appl. No. 17/016,334 Office Action dated Sep. 14, 2021.
U.S. Appl. No. 17/023,308 Corrected Notice of Allowability dated Mar. 7, 2024.
U.S. Appl. No. 17/023,308 Notice of Allowance dated Feb. 28, 2024.
U.S. Appl. No. 17/023,341 Office Action dated Dec. 9, 2021.
U.S. Appl. No. 18/171,945 Office Action dated Feb. 13, 2025.

* cited by examiner

SYSTEMS AND METHODS USING NETWORK ARTIFICIAL INTELLIGENCE TO MANAGE CONTROL PLANE SECURITY IN REAL-TIME

CROSS-REFERENCE TO RELATED APPLICATIONS

This application claims the benefit of U.S. Provisional Application No. 63/238,933, filed Aug. 31, 2021, which is incorporated by reference herein in its entirety.

BACKGROUND

Recent gains in efficiency due to remote administration of computing and infrastructure systems have increased the number of potential attacks on network infrastructure. Therefore, there is an increasing need for network-based attack detection systems to identify malicious actors.

SUMMARY

The level of security required by today's complex networks includes the ability to detect and manage network threats in real-time. These threats may be intentional disruptions to the network, the theft of data or secrets, or the injection of ransomware for the purposes of extortion. This is in part due to the remote administration of computing and infrastructure systems, as well as disaggregated models of current infrastructure systems in which the distribution of various functional components has increase the attack surface by malicious actors.

Current solutions are unable to detect abnormal activities in a network infrastructure indicative of a threat with any level of certainty. This may be due to the fact that the rules enforcement function, both in the control and management planes, is not done in real time. If malicious activity on the network occurs, it will only be known after the fact once the problem created by the malicious activity has manifested itself. As such, valuable time can be lost as the malicious activity is allowed to propagate throughout the network, in many cases residing within the network for months before actual detection. Therefore, there is the need for trust services that establish a hardware root of trust within the network infrastructure. Furthermore, the hardware root of trust should extend through software support at the virtualization and orchestration layers, to containers running on the platform to establish a secure network infrastructure.

The best way to detect and combat threats or malicious activity is in real time through the use of artificial intelligence/machine learning (AI/ML) techniques. Network packet header data processing using AI techniques to detect malicious user activity should be a required functionality across servers, networks, appliances and base station infrastructure elements for detecting abnormal activity. This real time detection may also help to identify malicious network transactions by providing runtime protection, detection, and automated recovery using AI/ML. Given the real time nature of this detection, this function is best performed at the platform level first, and then communicated to the remote administrator for further action upon detection of an abnormal activity. The path towards building zero-trust infrastructures, meaning that no entity or user on the network is trusted, starts with first securing the control and management plane.

In one aspect, disclosed herein are computer-implemented methods of detecting malicious activity in a network comprising: feeding network packets from the network into a header crypto engine for processing; sending the network packets from the header crypto engine to a work scheduler; divaricating the network packets using the work scheduler based on flow data and header data of the network packets to at least one of a static rule checker in a firewall, a wild card rule checker in the firewall, a denial-of-service engine in the firewall, and a neural network processor; generating output data comprising: a first output data from the firewall according to rules of the firewall; a second output data from the neural network processor based on behavioral analysis performed by the neural network processor, wherein the second output data is used to update the rules in the firewall; and aggregating the output data from the firewall and the neural network processor to detect malicious activity in the network. In some embodiments, the method further comprises providing the output data from any one of the static rule checker, the wild card rule checker, the denial-of-service engine, and the neural network processor as feedback into any one of the static rule checker, the wild card rule checker, the denial-of-service engine, and the neural network processor. In further embodiments, the feedback help reduce the number of false positives that need further investigation by the neural network processor, thereby improving the behavioral analysis of the neural network processor. In still further embodiments, the improving of the behavioral analysis improves the detecting of malicious activity in the network. In some embodiments, the network is a Network-on-chip interconnecting various IPs. In some embodiments, the static rule checker in the firewall monitors the network packets from known malicious nodes and users based on a first set of rules. In some embodiments, the wild card rule checker in the firewall monitors the network packets from partially known malicious nodes and users based on a second set of rules. In some embodiments, the denial-of-service engine in the firewall monitors traffic volume of the network packets based on a third set of rules. In some embodiments, the neural network processor comprises a packet header parser, a network flow classifier, and an AI acceleration engine. In further embodiments, the AI acceleration engine performs the behavior analysis of the network packets using a neural network. In still further embodiments, the behavior analysis comprises analyzing access patterns in the network packets and detecting behavioral anomalies in the access patterns to identify compromised remote administrators.

In another aspect, disclosed herein are computer-implemented systems comprising: at least one processor, a memory, and instructions executable by the at least one processor to create an architecture for detecting malicious activity in a network comprising: a header crypto engine for receiving and processing network packets from the network; a work scheduler for divaricating the network packets from the header crypto engine based on flow data and header data of the network packets to at least one of the following: a static rule checker in a firewall with a first set of rules for monitoring the network packets from known malicious nodes and users; a wild card rule checker in the firewall with a second set of rules for monitoring the network packets from partially known malicious nodes and users; a denial-of-service engine in the firewall with a third set of rules for monitoring traffic volume of the network packets; and a neural network processor for performing behavioral analysis of the network packets, wherein analysis results are used to update any one of the first set of rules, the second set of rules, and the third set of rules; and a result aggregator for aggregating output data from the static rule checker, the wild card rule checker, the denial-of-service engine, and the neural network processor to detect malicious activity in a network. In some embodiments, the system further comprises feedback loops wherein the output data from any one of the static rule checker, the wild card rule checker, the denial-of-service engine, and the neural network processor is fed back into any one of the static rule checker, the wild card rule checker, the denial-of-service engine, and the neural network processor. In further embodiments, the feedback loops help reduce the number of false positives that need further investigation by the neural network processor, thereby improving the behavioral analysis of the neural network processor. In still further embodiments, the improving of the behavioral analysis improves the detecting of malicious activity in the network. In some embodiments, the network is a Network-on-chip interconnecting various IPs. In some embodiments, the neural network processor comprises a packet header parser, a network flow classifier, and an AI acceleration engine. In further embodiments, the AI acceleration engine performs the behavior analysis of the network packets using a neural network. In still further embodiments, the behavior analysis comprises analyzing access patterns in the network packets and detecting behavioral anomalies in the access patterns to identify compromised remote administrators.

In another aspect, disclosed herein are platforms for detecting malicious activity in a network comprising: a network appliance and a neural network, the network appliance comprising a header crypto engine for receiving and processing network packets from the network; a firewall comprising: a static rule checker with a first set of rules for monitoring the network packets from known malicious nodes and users; a wild card rule checker with a second set of rules for monitoring the network packets from partially known malicious nodes and users; and a denial-of-service engine with a third set of rules for monitoring traffic volume of the network packets; a work scheduler for divaricating the network packets from the header crypto engine based on flow data and header data of the network packets to at least one of: the static rule checker of the firewall, the wild card rule checker of the firewall, the denial-of-service engine of the firewall, and the neural network; and a results aggregator for aggregating output data from the firewall and the neural network processor to detect malicious activity in a network; the neural network comprising: a packet header parser for parsing network packet header data of the network packets; a network flow classifier for classifying network traffic from the network packets; and an AI acceleration engine for performing behavior analysis of the network packets using a neural network. In various embodiments, the network appliance is a 3G base station, 4G base station, 5G base station, or telecom infrastructure. In some embodiments, the platform further comprises feedback loops wherein the output data from any one of the static rule checker, the wild card rule checker, the denial-of-service engine, and the neural network processor is fed back into any one of the static rule checker, the wild card rule checker, the denial-of-service engine, and the neural network processor. In further embodiments, the feedback loops help reduce the number of false positives that need further investigation by the neural network processor, thereby improving the behavioral analysis of the neural network processor. In still further embodiments, the improving of the behavioral analysis improves the detecting of malicious activity in the network. In some embodiments, the network is a Network-on-chip interconnecting various IPs. In various embodiments, the analysis results from the behavioral analysis are used to update any one of the first set of rules, the second set of rules, and the third set of rules. In some embodiments, the behavior analysis comprises analyzing access patterns in the network packets and detecting behavioral anomalies in the access patterns to identify compromised remote administrators.

In another aspect, disclosed herein are computer-implemented methods of training a neural network to detect malicious activity in a network comprising: collecting network data from a computer network; decrypting the network data; parsing the network data using a parser to obtain parsed network data; classifying the network data using a network flow classifier to obtain network traffic data; creating a training set comprising the parsed network data and the network traffic data; and training the neural network using the training set to detect abnormal activity in the network data. In some embodiments, the network data is network packet data. In further embodiments, the parser is a packet header parser and the network packet data is network packet header data. In some embodiments, the abnormal activity comprises behavior anomalies in access patterns in the parsed network data and the network traffic data.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
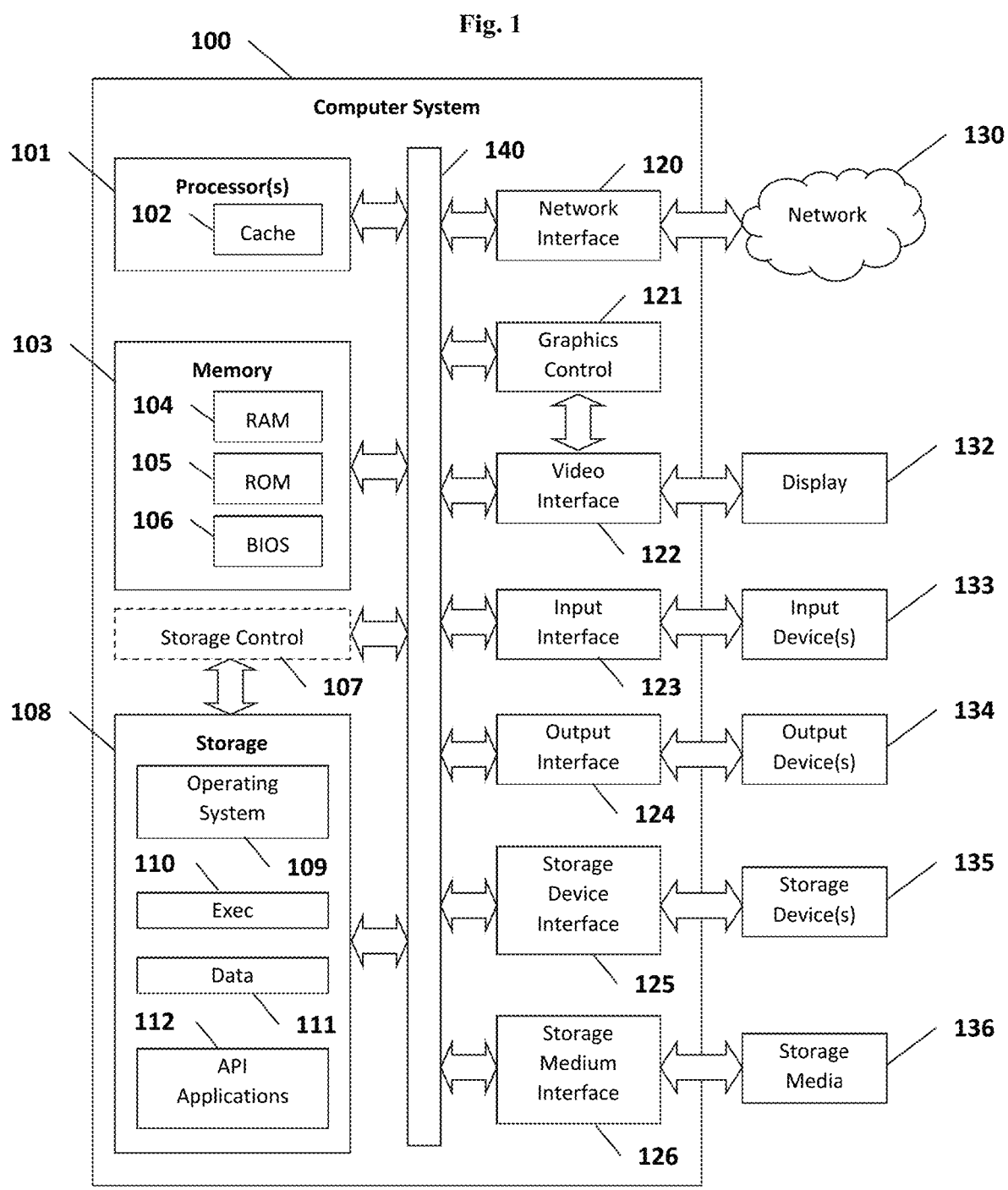
FIG. 1 shows a non-limiting example of a computing device including one or more processors, memory, storage, and a network interface.

Described herein, in certain embodiments, are computer-implemented methods of detecting malicious activity in a network comprising: feeding network packets from the network into a header crypto engine for processing; sending the network packets from the header crypto engine to a work scheduler; divaricating the network packets using the work scheduler based on flow data and header data of the network packets to at least one of a static rule checker in a firewall, a wild card rule checker in the firewall, a denial-of-service engine in the firewall, and a neural network processor; generating output data comprising: a first output data from the firewall according to rules of the firewall; a second output data from the neural network processor based on behavioral analysis performed by the neural network processor, wherein the second output data is used to update the rules in the firewall; and aggregating the output data from the firewall and the neural network processor to detect malicious activity in the network.

Also described herein, in certain embodiments, are computer-implemented systems comprising: at least one processor, a memory, and instructions executable by the at least one processor to create an architecture for detecting malicious activity in a network comprising: a header crypto engine for receiving and processing network packets from the network; a work scheduler for divaricating the network packets from the header crypto engine based on flow data and header data of the network packets to at least one of the following: a static rule checker in a firewall with a first set of rules for monitoring the network packets from known malicious nodes and users; a wild card rule checker in the firewall with a second set of rules for monitoring the network packets from partially known malicious nodes and users; a denial-of-service engine in the firewall with a third set of rules for monitoring traffic volume of the network packets; and a neural network processor for performing behavioral analysis of the network packets, wherein analysis results are used to update any one of the first set of rules, the second set of rules, and the third set of rules; and a result aggregator for aggregating output data from the static rule checker, the wild card rule checker, the denial-of-service engine, and the neural network processor to detect malicious activity in a network.

Also described herein, in certain embodiments, are platforms for detecting malicious activity in a network comprising: a network appliance and a neural network, the network appliance comprising a header crypto engine for receiving and processing network packets from the network; a firewall comprising: a static rule checker with a first set of rules for monitoring the network packets from known malicious nodes and users; a wild card rule checker with a second set of rules for monitoring the network packets from partially known malicious nodes and users; and a denial-of-service engine with a third set of rules for monitoring traffic volume of the network packets; a work scheduler for divaricating the network packets from the header crypto engine based on flow data and header data of the network packets to at least one of: the static rule checker of the firewall, the wild card rule checker of the firewall, the denial-of-service engine of the firewall, and the neural network; and a results aggregator for aggregating output data from the firewall and the neural network processor to detect malicious activity in a network; the neural network comprising: a packet header parser for parsing network packet header data of the network packets; a network flow classifier for classifying network traffic from the network packets; and an AI acceleration engine for performing behavior analysis of the network packets using a neural network.

Also described herein, in certain embodiments, are computer-implemented methods of training a neural network to detect malicious activity in a network comprising: collecting network data from a computer network; decrypting the network data; parsing the network data using a parser to obtain parsed network data; classifying the network data using a network flow classifier to obtain network traffic data; creating a training set comprising the parsed network data and the network traffic data; and training the neural network using the training set to detect abnormal activity in the network data.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used herein, the term "firewall" generally refers to a network security system that monitors network traffic. A firewall can protect against unauthorized access and grant authorized access from the network traffic. In some embodiments, a firewall filters incoming based on a set of rules. In some embodiments, a firewall filters outgoing network traffic based on a set of rules. A firewall can be implemented as a device or a set of devices, or software executed on a device, such as a computer or appliance, with network access. In some embodiments, firewalls can be integrated into operating systems of devices (e.g., computers, smart phones, tablets, or other types of network communication capable devices). In some embodiments, firewalls can be integrated into or executed as software on servers, gateways, network/routing devices (e.g., network routers), or appliances (e.g., security appliances or other types of special purpose devices).

As used herein, the term "malicious activity" generally refers to unwanted, hostile, or intrusive activity in a network infrastructure that can compromise any one of information integrity, confidentiality and availability. In some embodiments, the activity aims to disrupt the network infrastructure, collect private or sensitive information, or access private computer systems or networks in the network infrastructure. An actor or entity carrying out the malicious activity may be referred to as a "malicious actor" or a "malicious entity", respectively.

As used herein, the term "network packet" generally refers to a unit of data transferred across a network. The network packet may comprise of a header, payload, and trailer. In some embodiments, the payload may comprise data being transferred across the network. In some embodiments, one or both of the header or the trailer may comprise control information regarding the content, delivery, or a combination thereof of the network packet.

As used herein, the term "neural network" generally refers to a computational network composed of nodes. The nodes of the neural network may be connected as layers or graphs. In some embodiments, the neural network comprises an algorithm designed for solving a specific problem. In some embodiments, the neural network may comprise a generalizable algorithm to solve a range of problems. In some embodiments, the neural network may "learn" how to solve one or more problems.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDERBOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, handheld computers, Internet appliances, mobile smartphones, and tablet computers. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of network infrastructure information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Network Security

Trust and security are vital to ensure data center integrity and/or end-to-end network security for any provider of a network infrastructure. Network security may generally comprise policies, processes, and practices that may be adopted to prevent, detect, and monitor unauthorized activities within a network infrastructure. Such unauthorized activities may comprise unauthorized access, misuse, modification, or denial within a network infrastructure.

Figure 2:
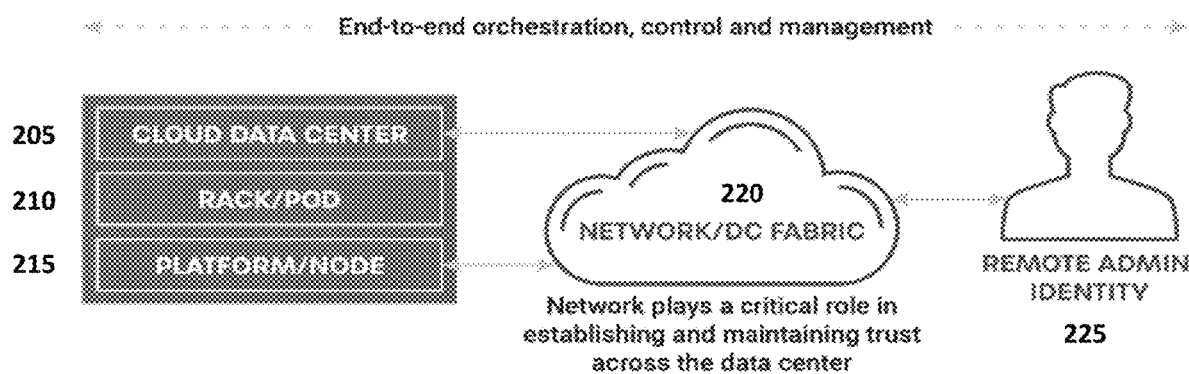
FIG. 2 shows a non-limiting example of an architecture diagram illustrating end to end network control management for establishing remote admin identity.

The ability to safely and securely execute critical functions performed at boot time and/or run-time, such as generating/maintaining cryptographic keys, updating firmware patches, trust services, attestation, authoring, and authentication, may all help determine the overall level of robustness of any platform in network infrastructure. The level of the robustness of the platform may be determined by these critical functions at boot time and run-time. Therefore, platform level security can be vital for ensuring data center level security, as well as end-to-end network security for a provider. Such platform level security measures may comprise of hardware and software components comprising a centralized security architecture in order to secure of an entire platform. Referring to FIG. 2, in an example, is an architecture diagram illustrating end to end network control management for establishing remote admin identify that provides platform-level trust and security using a network/data center (DC) fabric 220. The network/DC fabric 220 may contain information regarding the layout and connectivity of the computing, networking, and software components in network infrastructure.

The network/DC fabric 220 may be communicably coupled with a cloud data center 205, which may store data on cloud servers provided by a cloud service provider. The network/DC fabric 220 may transmit information to and from the cloud data center 205, which may contain instructions or queries. The cloud data center 205 may contain components, including a rack/pod 210 or a plurality thereof that make up a platform/node 215. In some embodiments, the platform/node 215 may also be communicably coupled with the network/DC fabric 220. Information may then be transmitted between the platform/node 215 and the network/DC fabric 220, which may also contain instructions or queries. By maintaining communication between both the cloud data center 205 and the platform/node 215, the network/DC fabric 220 can play a critical role in establishing and maintaining trust across the data center.

The network/DC fabric 220 may also communicate with a remote admin identity 225. The network/DC fabric 220 may validate credentials of the remote admin identity 225 and further control access of the remote admin identity 225 based on their credentials. In some embodiments, the remote admin identity 225 may be a remote employee accessing data from the cloud data center 205. In some embodiments, the network/DC fabric 220 may grant or deny access of the remote admin identity 225 to a resource (e.g., cloud data center 205, platform/node 215, a rack/pod 210, etc.) within the network infrastructure. In some embodiments, the remote admin identity 225 may be managing functions of the data center. In some embodiments, the functions may be timely executions of locally or remotely administered function. In some embodiments, these functions may be generating and maintaining cryptographic keys, updating firmware patches, trust services, attestations, authoring, and authentications.

The ability to remotely access networks to perform these functions can increased the efficiency of managing the network. Furthermore, some gains in efficiency and cost savings, can be achieved by not having an on-site IT/OT person. However, this increase in remote accessibility may also pose challenges to network security. These challenges often start from a platform level and can quickly percolate up to a node, cross-node data center, network infrastructure level, or any combination thereof.

Figure 3:
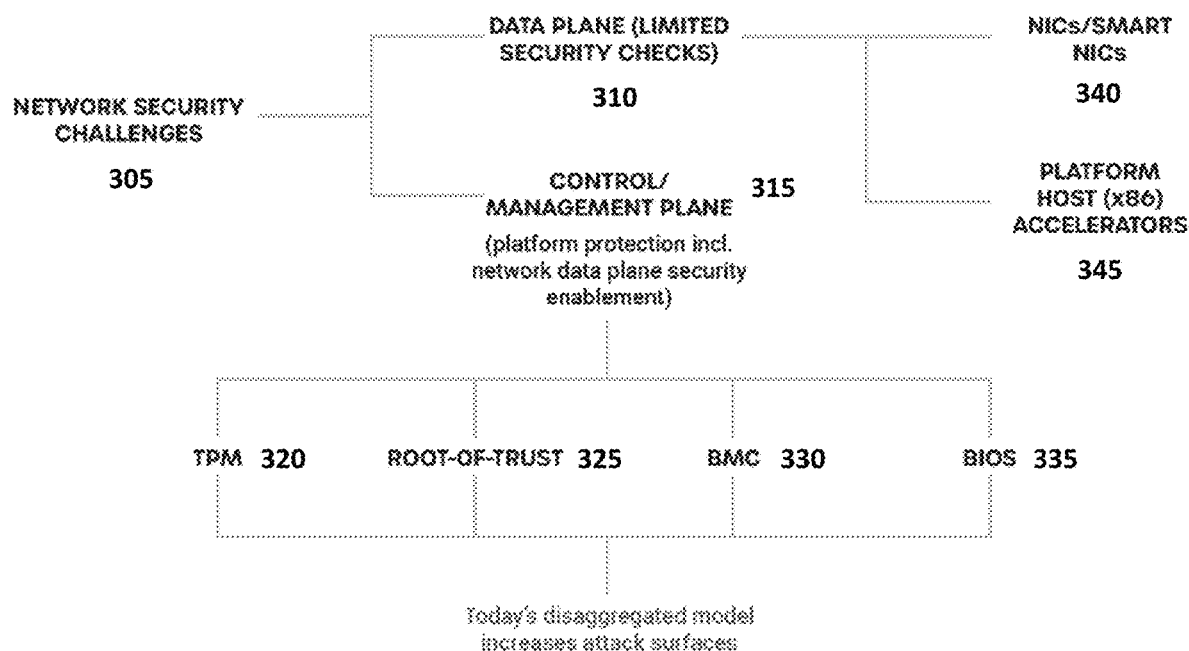
FIG. 3 shows a non-limiting example of an architecture diagram illustrating network security solution in server environments.

Referring to FIG. 3, in an example, is an architecture diagram illustrating network security solution in server environments. Network security challenges 305 may be classified into a data plane 310 and a control/management plane 315. The data plane 310, may comprise limited security rules that enforce security checks on incoming network traffic (e.g., network packets). In some embodiments, the security checks may be enforced during wire-speed packet processing. If the data plane 310 encounters exceptions to the configured security rules, it may divert the traffic to the control/management plane 315 for further inspection.

The control/management plane 315 may comprise "intelligence" (e.g., software for artificial intelligence) that may configure the data plane 310 to enable security policy enforcement. The control/management plane 315 may therefore provide a trusted shield that can allow the data plane 310 to enforce in-line security. However, the control/management plane 315 may be comprised of distributed security aspects, which may increase the attack surface for malicious actors. In some embodiments, for example, the security aspects may comprise one or more of a trusted platform module (TPM) 320, a Root-of-Trust 325, a baseboard management controller (BMC) 330, or a boot firmware flash (BIOS) 335.

The TPM 320 may comprise a dedicated microchip for performing security-related functions. In some embodiments, the TPM 320 may secure hardware through integrated cryptographic keys. The Root-of-Trust 325 may be a source in a cryptographic system that can always be trusted. In some embodiments, the Root-of-Trust 325 may verify that the software installed on all hardware components were the intended software. The BMC 330 may comprise a specialized service processor for monitoring the physical state of a computer, network server, or other hardware devices. In some embodiments, the BMC 330 may be in communication with the system administrator. The BIOS 335 may comprise firmware for performing hardware initialization during the booting process. In some embodiments, the BIOS 335 may also provide runtime services for operating systems and programs within the network infrastructure.

The data plane 310 may also comprise security aspects, including network interface controllers (NICs)/smart NICs 340 and platform host accelerators 345. The NICs/smart NICs 340 may comprise NICs comprising of hardware components that connect a computer to a computer network, as well as smart NICs comprising an on-board processor to perform any combination of encryption/decryption, firewall, TCP/IP and HTTP processing. The platform host accelerators 345 may comprise a hardware device for running a software program to enhance the overall performance of the system. In some embodiments, the platform host accelerators 345 may provide faster encryption and decryption in the cryptographic system.

However, the rules enforcement functions on the control/management plane 315 may not done in real time, which may create a gap in network security systems. In other words, there may be no real-time malicious entity detection system or a method to distribute such information across end-to-end networks. In some embodiments, the malicious entity may intend to create havoc on the network by flooding it with network packets or carry out other malicious activity meant to disrupt the network. In some embodiments, the malicious entity may intend to steal data or secrets within a network. In some cases, the entity may gain access to a network, either by hacking into it externally, or internally in the case of a rogue employee or contractor. In some examples, the entity may attempt to elevate their privileges (e.g., security privileges) to gain access to more sensitive areas of the networks, such as vaults where keys (e.g., cryptographic keys) may be kept. In some embodiments, the entity may have the intent of extorting money from the owner of the infrastructure (e.g., a server or network element). In some cases, once a malicious entity gains access to a platform/node in the network infrastructure, they may install ransomware to lock out legitimate administrators to extort money from the owner.

In an exemplary embodiment, in 5G based station environments, careful sequencing of node bring-up may be orchestrated to avoid remote entity authentication. However, it may be hard to rely just on sequencing of the node bring-up or authentication of the remote administrator one time and assume the control plane agent behind that station may not be malicious. In some embodiments, a remote employee's credentials may be stolen by hackers, who may then use it to try and gain access to the network. The lack of a real time detection system implies that if malicious activities, as described herein, do occur, they may only be known after the fact. Therefore, the recognition of malicious activity on the network should occur in real-time in order to avoid the negative effects, which may be deleterious and long-lasting, on the network.

Network Packets

An analysis of network packets, comprising their components (e.g., header-based analysis) and traffic patterns, may be used for real time detection of malicious activity. Network packets are a unit of data transferred across a network which may comprise of a header, payload, and trailer. In some embodiments, the payload may comprise data (e.g., email content, video content, etc.) being transferred across the network. In some embodiments, the payload may comprise user data. In some embodiments, one or both of the header or trailer may comprise control information regarding the delivery of the payload. In some cases, the control information may comprise of source and destination network addresses, protocols to identify the type of packet (e.g., email, video, etc.), error detection codes, the packet number, or bits of information regarding the complete delivery of the packet (e.g., cyclic redundancy check (CDC)).

In some embodiments, network packets may be made up of levels of nested data, known as layers. Data which may interpreted directly by a machine may be referred to as "layer 1 (L1)", or physical layer, data. "Layer 2 (L2)", or data link layer, data may be LAN (local area network) data. In some embodiments, the LAN data may be MAC (media access control) data uniquely identifying an adapter on the LAN. Within the "layer 2" packet may be "layer 3 (L3)", or network layer, data defining among other things the IP source address and destination address of the packet. Within the layer 3 packet may be "layer 4 (L4)" data, or transport layer data. In some embodiments, transport layer data may comprise TCP (transmission control protocol) data.

Figure 4:
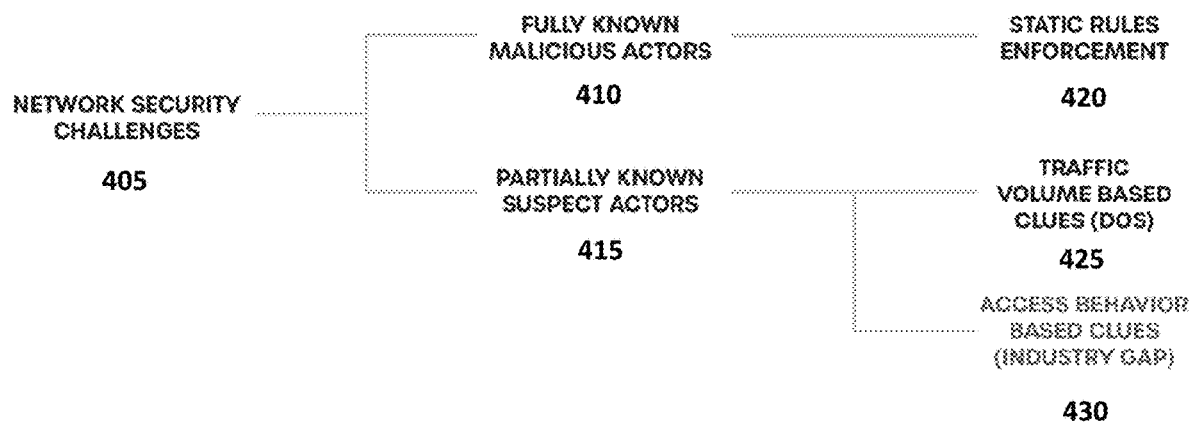
FIG. 4 shows a non-limiting example of an architecture diagram illustrating gaps in existing threat detection models.

Referring to FIG. 4, in an example, is an architecture diagram illustrating gaps in existing threat detection models by analyzing network packets. Network security challenges 405 may comprise threats from fully known malicious actors 410, as well as partially known suspect actors 415. In some embodiments, fully know malicious actors 410 may be identified by higher level software and may comprise of users operating fully known malicious nodes. In some embodiments, partially know suspect actors 415 may be operating partially known suspect nodes. In some embodiments, a threat from partially known suspect actors 415 may comprise knowing the upper 16 bits of a 32-bit IPv4 address.

The fully known malicious actors 410 may be managed using static rules enforcement 420. In some embodiments, the static rules enforcement 420 may be done across platforms or nodes in a network. In some embodiments, the static rule enforcement 420 may comprise predefined rules (i.e., as in fully known rules) for granting or denying access to a network infrastructure. In some embodiments, the predefined rules may comprise of rules indicating all traffic from a given IP address should be discarded. In some embodiments, the predefined rules may comprise a list of sources or IP addresses that may have access to a network infrastructure. In some embodiments, information in the network packets may be compared against the predefined list to grant or deny access to the network infrastructure. In some embodiments, however, a malicious actor may fake an IP address or may create their own network packet to bypass the static rule enforcement 420. Furthermore, this detection may not be done in real time with conventional security systems and therefore the malicious actor may be undetected. In alternative embodiments, partially known rules may exist and may be configured in hardware tables, which may be enforced with one or more Content Addressable Memories (CAM) in the hardware within the network. In some embodiments, all traffic from a give UP subnet mask and TCP port number may be subjected to further action by the hardware.

The partially known suspect actors 415 may be managed using traffic volume based clues (also referred to as Denial-of-Service (DOS)) 425. In some embodiments, traffic volume-based attacks may be detected using hardware-based traffic policers that can detect Denial-of-Service (DOS) attacks. In some embodiments, the traffic volume based clues (DOS) 425 may comprise traffic volume per a given time interval across a node or a group of nodes. In some embodiments, the traffic volume based clues (DOS) 425 may detect a flooding of a network with network packets in an attempt to bring down the network.

As mentioned, the lack of a real-time detection system makes maintaining network security challenging. This is especially true when an identity of a malicious actor is only partially known, and therefore their behavior cannot be fully monitored. This may be overcome using access behavioral clues 430 from network access patterns, such as those from partially known suspect actors 415. In some embodiments, the partially known suspect actors 415 may be rogue employees who access the network with their credentials and engage in activities out of the ordinary. In some cases, such activities may comprise moving large amounts of data or asking for access to security keys. Without access behavioral clues 430, the activities of the rogue employees may only be known after the fact. These access behavioral clues 430 may be detected using an AI-based threat detection technique.

Secure AI™ Pipeline

Figure 5:
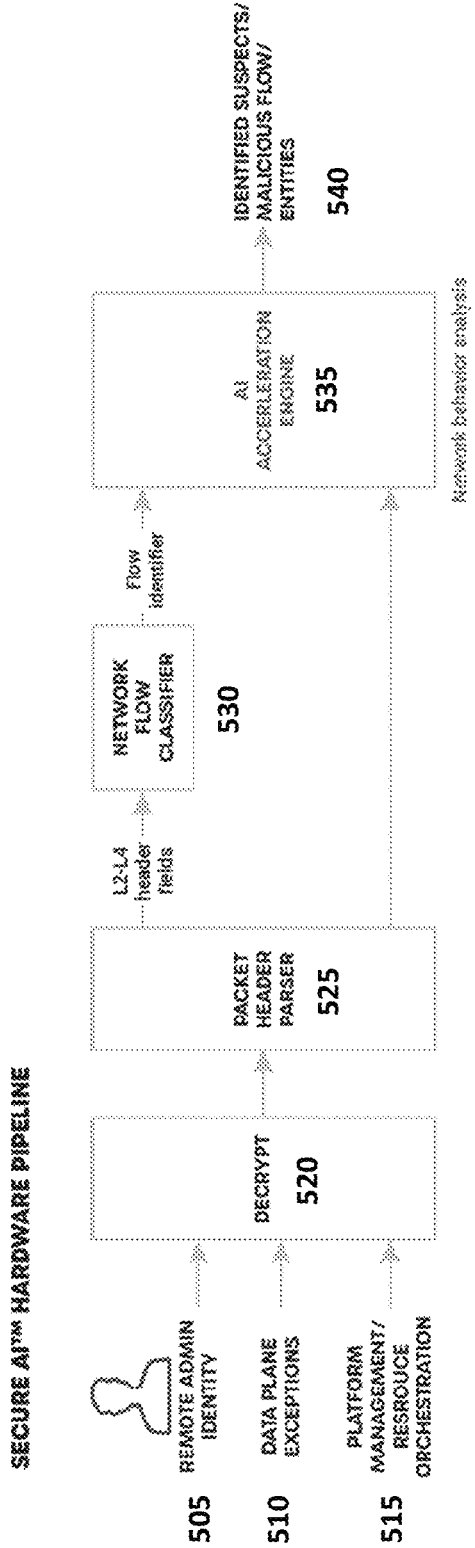
FIG. 5 shows a non-limiting example of a block diagram illustrating a secure AI pipeline including an AI acceleration engine.

A hardware acceleration for running behavioral analysis to obtain access behavioral cues 430, as exemplary embodied in FIG. 4, may be implemented in a network security system. The behavioral analysis may be performed using a neural network and may be run on an AI acceleration engine 535. In some embodiments, the behavioral analysis may help to mark the network flow traffic or end stations as 'suspect' or 'malicious' based on access patterns. An example of a block diagram illustrating a secure AI™ pipeline, including an AI acceleration engine 535 is shown in FIG. 5.

In some embodiments, the secure AI pipeline may receive information or data as network packets. In some embodiments, the network packets may contain data comprising a remote admin identity 505 which may be trying to access the network. In some cases, the remote admin identity 505 may be a remote administrator with compromised credentials. In some cases, the remote administrator may be trying to access sensitive information in the network. In alternative embodiments, the secure AI pipeline may receive network packets with data comprising data plane exceptions 510. In some cases, the data plane exceptions 510 may comprise exceptions to the configured or predetermined security rules (i.e., static rules) in the network that may be diverted to the AI acceleration engine 535 for further inspection. In alternative embodiments, the secure AI piping may receive network packets with data related to platform management/resource orchestration 515. In some embodiments, the data related to platform management/resource orchestration 515 may comprise of abnormalities in the configuration, coordination, or management of resources within a network infrastructure.

In some embodiments, the secure AI pipeline may decrypt 520 network packets that are received. In some embodiments, cryptographic keys or passwords may be required to decrypt 520 and access information in the network packets.

Network packets may then be fed into a packet header parser 525 in the secure AI pipeline. The packet header parser 525 may parse the header of the network packet to retrieve information. In some embodiments, the information in the header may comprise of information as disclosed herein. In some embodiments, the packet header parser 525 is a L2, L3, L4 packet header parser, or any combination thereof.

In some embodiments, the L2, L3, L4 header fields, or any combination thereof may be obtained from the packet header parser 525, which may be fed into a network flow classifier 530. In some embodiments, the network flow classifier 530 may classify based on port numbers or utilize statistical classifications for classifying network traffic. In some cases, statistical classification may utilize machine learning algorithms (e.g., K-means, naive Bayes filter, random forest, etc.) to classify based on attributes of the network packets. In some examples, the attributes of the network packets may comprise byte frequencies, packet size, or packet inter-arrival time. In alternative embodiments, the network flow classifier 530 may receive decrypted network packets and utilize deep packet inspection to inspect the payload of the packet. In some embodiments, the network traffic classifier 530 may classify the network traffic into classes (e.g., sensitive, best-effort, undesired, etc.).

In some embodiments, the network traffic classifier 530 may output a flow identifier with identifying information of a given network packet, which may be fed into an AI acceleration engine 535. In alternative embodiments, network packets that have parsed headers from the packet header parser 525 may be directly fed into the AI acceleration engine 535.

The AI acceleration engine 535 may comprise of hardware to run network behavioral analysis. This network behavioral analysis may be done using a neural network. In some embodiments, the AI acceleration engine 535 may perform inferencing functions from received data from network packets. The inferencing functions may allow for the detection of behavioral anomalies by comparing activity from a given address to what has occurred previously. In some embodiments, the behavioral anomaly detection may be done in real time. In an example, for threats from partially known malicious actors in which only the upper 16 bits of a 32-bit IPv4 address may be known, the upper 16 bits may be set and the AI acceleration engine 535 may be used to trap suspect network packets. In an alternative example, the AI acceleration engine 535 may detect and trap network packets when there may be an abnormal number of packets in the network in a given time interval. If the AI acceleration engine 535 encounters abnormal activity relative to what has occurred previously, appropriate actions may be taken, such as alerting appropriate entity (e.g., administrator of the network infrastructure).

Figure 6:
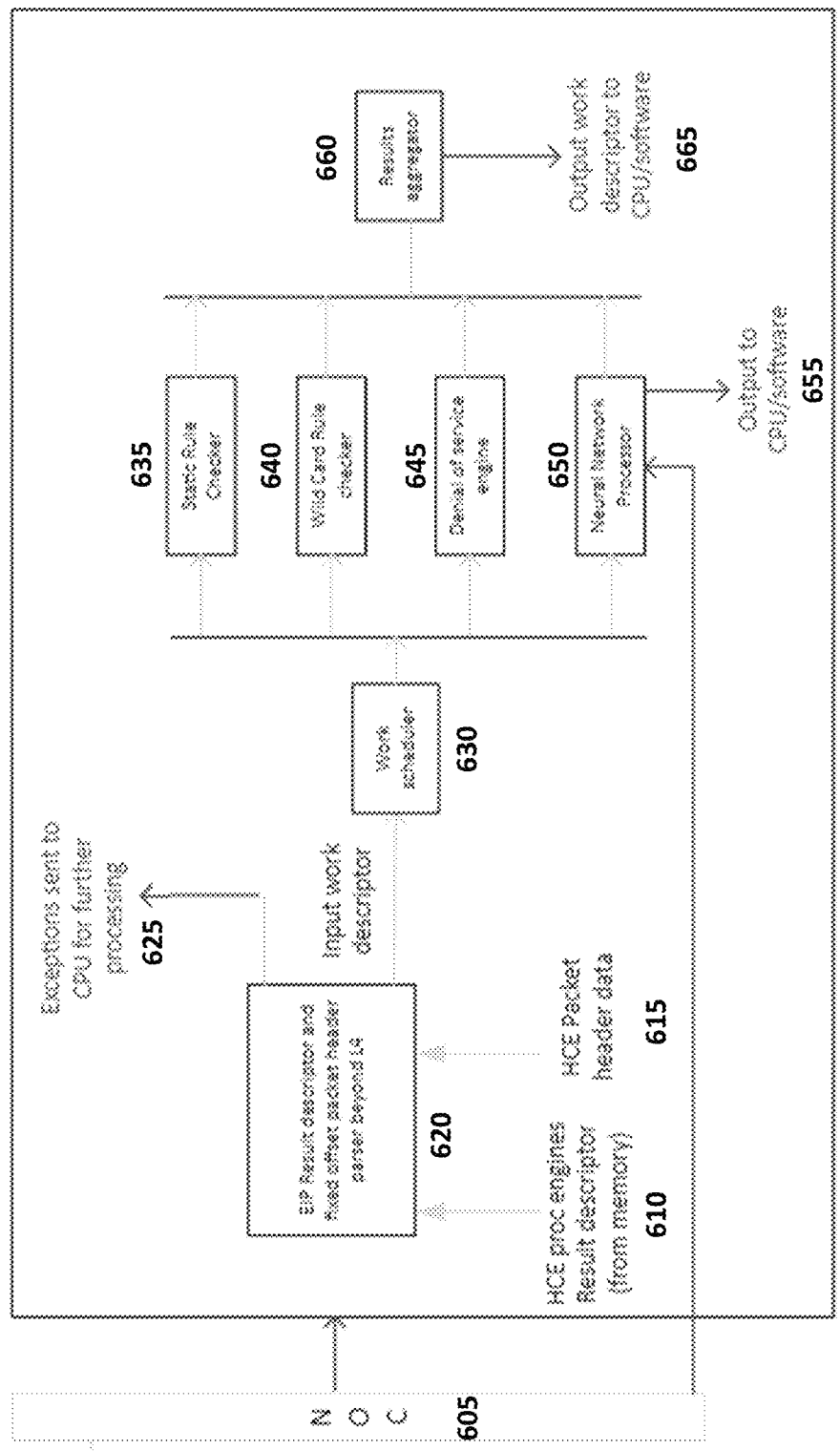
FIG. 6 shows a non-limiting example of a block diagram illustrating a security architecture for detecting malicious activity including a firewall and neural network processor.

In some embodiments, the AI secure pipeline containing a neural network may be integrated as part of a firewall and neural network engine. Referring to FIG. 6 is an example of a block diagram illustrating a security architecture for detecting malicious activity, including a firewall and neural network processor. The security architecture exemplary illustrated in FIG. 6, may receive network packets as inputs from a Network-on-chip (NOC) 605, which may interconnect various IPs. In some embodiments, the security architecture comprises a header crypto engine (HCE) which may help receive incoming network packets and process header data.

Header Crypto Engine (HCE)

A crypto engine generally refers to a cryptographic module for performing cryptographic operations. In some embodiments, the cryptographic module may comprise a plurality of chips designed to encrypt and/or decrypt incoming data. In some cases, the plurality of chips may comprise an algorithm data chip for implementing the cryptographic operation and a control processor chip for controlling the cryptographic operation (e.g., encryption and/or decryption rate). In some embodiments, a crypto engine may be self-contained. In some embodiments, the crypto engine may be integrated into devices. In some embodiments, the crypto engine may be used with digital link encryption, telecommunications, fiber optics, local area network, embedded computer applications, or microchips (e.g., a NOC). A header crypto engine (HCE) may thus comprise a crypto engine for performing cryptographic operations on headers of network packets.

The header crypto engine, as exemplary embodied in FIG. 6, may help receive incoming network packets by storing network packets received from the NOC 605 in a memory space set aside in the network (i.e., a packet buffer). The HCE may generate an HCE process engines result descriptor 610 with information describing the stored packets (e.g., memory address, size of data, type of data, etc.). The header crypto engine may also directly process header data by decrypting the network packets headers. This may generate HCE packet header data 615, which may also hold information describing the network packets. In further embodiments, HCE process engines result descriptor 610, HCE packet header data 615, or a combination thereof, may be sent to an extended instruction pointer (EIP) results descriptor and fixed offset packet header parser beyond L4 620.

An extended instruction pointer (EIP) may generally hold information regarding the next instruction to be executed in a program of a network. In some embodiments, the information may be the first bytes of the next command. In some embodiments, the EIP may be a register in x86 architectures (32 bit). In some embodiments, the packet header may contain layers beyond layer 4, which may be parsed with the fixed offset packet header parser exemplary embodied in 620. In some embodiments, the fixed offset packet header parser 620 may comprise an advanced extensible interface (AXI), which may allow for higher performance interconnecting with the NOC 605 or other resources described herein. In some embodiments, the EIP results descriptor and fixed offset packet header parser beyond L4 620 may send the network packets to a work scheduler 630. In some embodiments, the EIP results descriptor and fixed offset packet header parser beyond L4 620 may send an input work descriptor of the network packets to a work scheduler 630. In some embodiments, the input work descriptor may be a structure containing information describing the network packets. In some embodiments, the input work descriptor may comprise a unique identifier (i.e., handle) of the network packet. In some embodiments, the unique identifier may comprise of a non-negative integer value. In alternative embodiments, exceptions encountered by the EIP results descriptor and fixed offset packet header parser beyond L4 620 may be sent to a CPU for further processing 625.

The work scheduler 630 generally refers to an arbiter on a node in the network infrastructure. In some embodiments, the work scheduler 630 may be part of an operating system. In some embodiments, the work scheduler 630 may assign a resource or a plurality thereof in a network infrastructure to perform tasks. In some embodiments, the resource may be a processor, network link, or expansion card. In some embodiments, the resource may comprise a firewall or a neural network processor. In some cases, the work scheduler 630 may divaricate the network packets to a firewall or a neural network processor 650 based on the input work descriptor.

Firewall

A firewall may comprise a network security system for monitoring network traffic. In some embodiments, a firewall may control access to a network based on a set of rules. In some cases, the set of rules may be predetermined. In some cases, the set of rules may be changed over time. A firewall may be implemented as a device or a set of devices, as described herein. In some embodiments, firewalls may be integrated into operating systems of devices, as described herein.

In some embodiments, a firewall may analyze incoming network packets from network. IN some embodiments, the network packets may be received from the work scheduler 630 and the firewall may apply policies (i.e., rules) for security classification. In some examples, the security classification may comprise of granting of denying access. In some embodiments, the firewall may comprise of multiple components. In some cases, the multiple components may comprise of any one of a static rule checker 635, a wild card rule checker 640, and a denial-of-service engine 645.

A static rule checker 635 in a firewall may comprise a first set of rules for monitoring the network packets from known malicious nodes and users, such as those described herein. In some embodiments, the first set of rules may be predetermined. In some embodiments, the first set of rules may be updated based on feedback from another resource in the network infrastructure. A wild card rule checker 640 in a firewall may comprise a second set of rules for monitoring the network packets from partially known malicious nodes and users, such as those described herein. In some embodiments, the second set of rules may be predetermined. In some embodiments, the second set of rules may be updated based on feedback from another resource in the network infrastructure. A denial-of-service engine 645 in a firewall may comprise a third set of rules for monitoring traffic volume of the network packets. In some embodiments, the third set of rules may be predetermined. In some embodiments, the third set of rules may be updated based on feedback from another resource in the network infrastructure.

Neural Network Processor

In some embodiments, the work scheduler 630 may send network packets to a neural network processor 650. The neural network processor 650 may comprise of an AI pipeline, further comprising a packet header parser 525, a network flow classifier 530, an AI acceleration engine 535, or a combination thereof, as exemplary embodied in FIG. 5. The AI acceleration engine 535 may comprise of hardware for performing behavioral analysis which may be done using a neural network. In some embodiments, behavioral analysis may comprise of analyzing network packets from the work scheduler 630. In some embodiments, the behavioral analysis may comprise of analyzing network packets received from the NOC 605. In some embodiments, the behavioral analysis may comprise of analyzing information and network packets from the firewall comprising any one of the static rule checker 635, the wild card rule checker 640, and the denial-of-service engine 645, for further inspection by the neural network processor 650.

The neural network processor 650, as described herein, may contain a neural network running on the AI acceleration engine 535. The neural network may generally comprise of connected nodes in a network. These nodes may perform functions which may translate input data, and the output may be passed onto another node. In some embodiments, the nodes in the network may comprise of input units, hidden units, output units, or a combination thereof. In some embodiments, the nodes may be organized into layers to generate a network (e.g., feed forward neural networks, convolutional neural networks, recurrent neural networks, etc.). In some embodiments, the nodes may be organized into graphs to generate a network (e.g., graph neural networks). The connections between nodes may further comprise of weights for adjusting input data as it is passed between the nodes (i.e., to activate data or deactivate data). In some embodiments, the weights may be learned by the neural network. In some embodiments, the neural network may be trained using gradient-based optimizations. In some cases, the gradient-based optimization may comprise of loss functions, cost functions, or a combination thereof.

The neural network, as described herein, may use the network packets from the work scheduler 630 as input data. The neural network may perform behavioral analysis of the network packets by analyzing the header, payload, trailer, or a combination thereof. In some embodiments, the neural network may analyze access patterns in the network packets (e.g., location of access, frequency of access, etc.). In some embodiments, the behavioral analysis further comprises detecting behavioral anomalies in the access patterns (e.g., an attempt to gain access to sensitive areas of the networks, large traffic volume in an area of the network). In some embodiments, the behavioral anomalies in the access patterns may be indicative of a comprised administrator or a hacker. In some embodiments, the neural network in the neural network processor 650 may output to CPU/software 655 information comprising of behavioral anomalies that may be detected.

In some embodiments, the exemplary block diagram of FIG. 6 may further comprise feedback loops between any one of the static rule checker 635, wild card rule checker 640, denial-of-service engine 645, and neural network processor 650. In some embodiments, the neural network processor comprising the AI acceleration engine 535 may analyze access patterns and output data comprising of updates to rules of the firewall. In some cases, the output data may comprise of updates to the first set of rules of the static rule checker 635. In some examples, the updates to the first set of rules may comprise of adding a source or an IP address from a malicious actor to an existing list of IP address to deny access from. In some cases, the output data may comprise of updates to the second set of rules of the wild card rule checker 640. In some examples, the updates to the second set of rules may comprise of modifying a list of partially known IP address. In some examples, a partially known IP address from a malicious actor may become known and may be moved from the second set of rules to the first set of rules. In some cases, the output data may comprise of updates to the third set of rules of the denial-of-service engine 645. In some examples, the updates to the third set of rules may comprise of modifying thresholds of network traffic volume within areas of the network infrastructure that may be considered abnormal. In some embodiments, the output data from any one of the static rule checker 635, the wild card rule checker 640, the denial-of-service engine 645, the neural network processor 650, or any combination thereof may be fed back into any one of the static rule checker 635, the wild card rule checker 640, the denial-of-service engine 645, the neural network processor 650, or any combination thereof. In some embodiments, the output from any one of the static rule checker 635, the wild card rule checker 640, the denial-of-service engine 645, or the neural network processor 650 may be combined in a results aggregator 660.

Results Aggregator

The results aggregator 660 may generally comprise a program for aggregating data from multiple sources in a network infrastructure. In some embodiments, the result aggregator may comprise of software, hardware, or a combination thereof. In some embodiments, the results aggregator may be integrated into a security architecture, an example of which is illustrated in FIG. 6. In some embodiments, the results aggregator 660 may aggregate output data from the firewall, comprising of the static rule checker 635, the wild card rule checker 640, and the denial-of-service engine 645, the neural network processor 650, or a combination thereof. In some embodiments, the results aggregator 660 may aggregate output from the firewall, the neural network processor 650, or a combination thereof in order to take corrective action on the incoming stream of network packets. In some embodiments, the results aggregator 660 may aggregate output from the firewall, the neural network processor 650, or a combination thereof in order to take corrective action against a malicious actor (e.g., alerting an appropriate entity, such as an administrator of the network infrastructure). This approach to network security may allow behavioral anomalies in the network to be detected and quarantined in real time. Therefore, this approach may reduce the frequency and severity of attacks and minimize the negative impacts of such attacks on the network infrastructure.

EXAMPLES

The following illustrative examples are representative of embodiments of the software applications, systems, and methods described herein and are not meant to be limiting in any way.

Example 1-AI Network Model with NSL-KDD Dataset

A network security architecture, as described herein, was tested using the NSL-KDD dataset, which is used to detect network intrusions. The NSL-KDD dataset covers four different type of network attacks: denial-of-service, probe, user to root (U2R), and remote to local (R2L). The probe attacks are used by malicious actors for surveillance of a network. The U2R and R2L attacks are used by malicious actors to promote their status within a network and hack into various stations and platforms connected to the networks.

A neural network was built to detect all four types of attacks. The neural network leveraged intrinsic features derived from the packet header, content features derived from the packet payload, time-based features derived from packets over a time window, and host-based features derived from packets to and from a malicious actor's machine.

The security architecture comprising the secure AI™ pipeline was used with the NSL-KDD dataset for benchmarking. Tests were run on the base-model using Files 1-9 (of 41 files). The tests achieved an accuracy of better than 90% for identifying network attacks. Furthermore, using all 41 files of the NSL-KDD database per sample, an accuracy better than 98% was achieved for identifying network attacks.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method of detecting malicious activity in a network comprising:
 a) feeding network packets from the network into a header crypto engine for processing;
 b) sending the network packets from the header crypto engine to a work scheduler;
 c) divaricating the network packets using the work scheduler based on flow data and header data of the network packets to at least one of a static rule checker in a firewall, a wild card rule checker in the firewall, a denial-of-service engine in the firewall, and a neural network processor;
 d) generating output data comprising:
  i) a first output data from the firewall according to rules of the firewall; and
  ii) a second output data from the neural network processor based on behavioral analysis performed by the neural network processor, wherein the second output data is used to update the rules in the firewall; and e) aggregating the output data from the firewall and the neural network processor to detect malicious activity in the network.

2. The method of claim 1, further comprising providing the output data from any one of the static rule checker, the wild card rule checker, the denial-of-service engine, and the neural network processor as feedback into any one of the static rule checker, the wild card rule checker, the denial-of-service engine, and the neural network processor.

3. The method of claim 2, wherein the feedback help reduce a number of false positives that need further investigation by the neural network processor, thereby improving the behavioral analysis of the neural network processor.

4. The method of claim 3, wherein the improving of the behavioral analysis improves the detecting of malicious activity in the network.

5. The method of claim 1, wherein the network is a Network-on-chip interconnecting various internet protocols (IPs).

6. The method of claim 1, wherein the static rule checker in the firewall monitors the network packets from known malicious nodes and users based on a first set of rules.

7. The method of claim 1, wherein the wild card rule checker in the firewall monitors the network packets from partially known malicious nodes and users based on a second set of rules.

8. The method of claim 1, wherein the denial-of-service engine in the firewall monitors traffic volume of the network packets based on a third set of rules.

9. The method of claim 1, wherein the neural network processor comprises a packet header parser, a network flow classifier, and an artificial intelligence (AI) acceleration engine.

10. The method of claim 9, wherein the AI acceleration engine performs the behavior analysis of the network packets using a neural network.

11. The method of claim 10, wherein the behavior analysis comprises analyzing access patterns in the network packets and detecting behavioral anomalies in the access patterns to identify compromised remote administrators.

12. The computer-implemented method of claim 1, further comprising training a neural network of the neural network processor to detect malicious activity in a network comprising:
   a) collecting network data from the network;
   b) decrypting the network data;
   c) parsing the network data using a parser to obtain parsed network data;
   d) classifying the network data using a network flow classifier to obtain network traffic data;
   e) creating a training set comprising the parsed network data and the network traffic data; and
   f) training the neural network using the training set to detect abnormal activity in the network data.

13. The method of claim 12, wherein the network data is network packet data.

14. The method of claim 12, wherein the parser is a packet header parser and the network packet data is network packet header data.

15. The method of claim 12, wherein the abnormal activity comprises behavior anomalies in access patterns in the parsed network data and the network traffic data.

16. A computer-implemented system comprising: at least one processor, a memory, and instructions executable by the at least one processor to create an architecture for detecting malicious activity in a network comprising:

a) a header crypto engine for receiving and processing network packets from the network;
b) a work scheduler for divaricating the network packets from the header crypto engine based on flow data and header data of the network packets to at least one of the following:
   i) a static rule checker in a firewall with a first set of rules for monitoring the network packets from known malicious nodes and users;
   ii) a wild card rule checker in the firewall with a second set of rules for monitoring the network packets from partially known malicious nodes and users;
   iii) a denial-of-service engine in the firewall with a third set of rules for monitoring traffic volume of the network packets; and
   iv) a neural network processor for performing behavioral analysis of the network packets, wherein analysis results are used to update any one of the first set of rules, the second set of rules, and the third set of rules; and
c) a result aggregator for aggregating output data from the static rule checker, the wild card rule checker, the denial-of-service engine, and the neural network processor to detect malicious activity in a network.

17. The system of claim 16, further comprising feedback loops wherein the output data from any one of the static rule checker, the wild card rule checker, the denial-of-service engine, and the neural network processor is fed back into any one of the static rule checker, the wild card rule checker, the denial-of-service engine, and the neural network processor.

18. The system of claim 17, wherein the feedback loops help reduce a number of false positives that need further investigation by the neural network processor, thereby improving the behavioral analysis of the neural network processor.

19. The system of claim 18, wherein the improving of the behavioral analysis improves the detecting of malicious activity in the network.

20. The system of claim 16, wherein the network is a Network-on-chip interconnecting various internet protocols (IPs).

21. The system of claim 16, wherein the neural network processor comprises a packet header parser, a network flow classifier, and an artificial intelligence (AI) acceleration engine.

22. The system of claim 21, wherein the AI acceleration engine performs the behavior analysis of the network packets using a neural network.

23. The system of claim 22, wherein the behavior analysis comprises analyzing access patterns in the network packets and detecting behavioral anomalies in the access patterns to identify compromised remote administrators.

24. A platform for detecting malicious activity in a network comprising: a network appliance and a neural network,
   the network appliance comprising:
   a) a header crypto engine for receiving and processing network packets from the network;
   b) a firewall comprising:
      i) a static rule checker with a first set of rules for monitoring the network packets from known malicious nodes and users;
      ii) a wild card rule checker with a second set of rules for monitoring the network packets from partially known malicious nodes and users; and iii) a denial-of-service engine with a third set of rules for monitoring traffic volume of the network packets;

c) a work scheduler for divaricating the network packets from the header crypto engine based on flow data and header data of the network packets to at least one of: the static rule checker of the firewall, the wild card rule checker of the firewall, the denial-of-service engine of the firewall, and the neural network; and d) a results aggregator for aggregating output data from the firewall and the neural network processor to detect malicious activity in a network;

the neural network processor comprising:

a) a packet header parser for parsing network packet header data of the network packets;

b) a network flow classifier for classifying network traffic from the network packets; and c) an artificial intelligence (AI) acceleration engine for performing behavior analysis of the network packets using a neural network.

25. The platform of claim 24, wherein the network appliance is a 3G base station, 4G base station, 5G base station, or telecom infrastructure.

26. The platform of claim 24, further comprising feedback loops wherein the output data from any one of the static rule checker, the wild card rule checker, the denial-of-service engine, and the neural network processor is fed back into any one of the static rule checker, the wild card rule checker, the denial-of-service engine, and the neural network processor.

27. The platform of claim 26, wherein the feedback loops help reduce a number of false positives that need further investigation by the neural network processor, thereby improving the behavioral analysis of the neural network processor.

28. The platform of claim 27, wherein the improving of the behavioral analysis improves the detecting of malicious activity in the network.

29. The platform of claim 24, wherein the network is a Network-on-chip interconnecting various internet protocols (IPs).

30. The platform of claim 24, wherein analysis results from the behavioral analysis are used to update any one of the first set of rules, the second set of rules, and the third set of rules.

31. The platform of claim 24, wherein the behavior analysis comprises analyzing access patterns in the network packets and detecting behavioral anomalies in the access patterns to identify compromised remote administrators.

* * * * *